Nov 1, 1949.  C. F. BAUER ET AL  2,486,381
WAGON BOX

Filed May 28, 1945  2 Sheets-Sheet 1

INVENTORS
CARL F. BAUER, DONALD A.
BY WANGELIN, CLIFFORD L. SCOTT

ATTORNEYS

Nov 1, 1949.  C. F. BAUER ET AL  2,486,381
WAGON BOX
Filed May 28, 1945  2 Sheets-Sheet 2
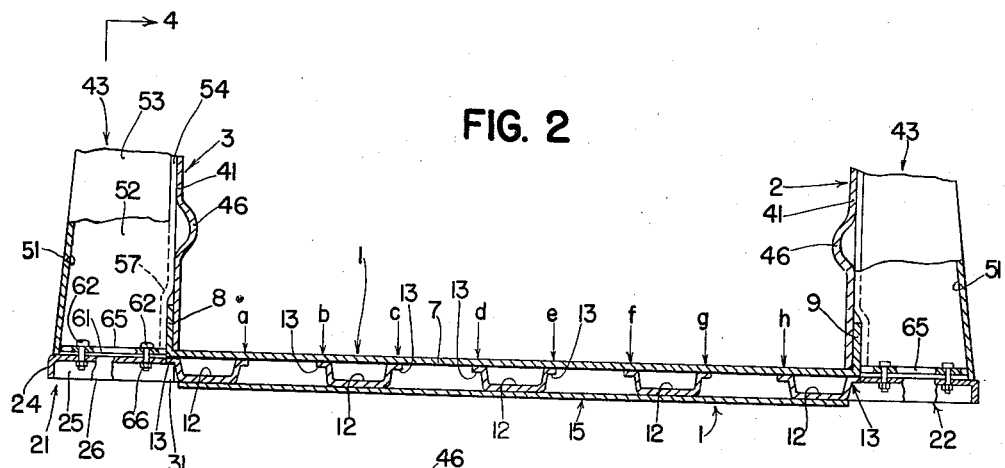
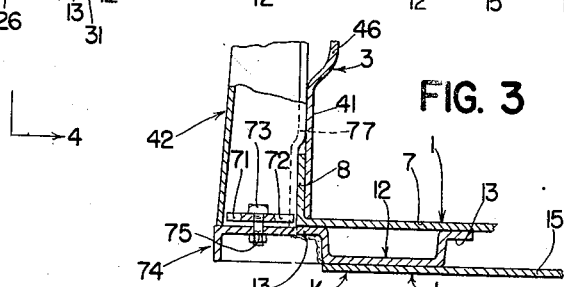
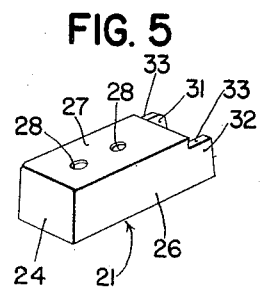
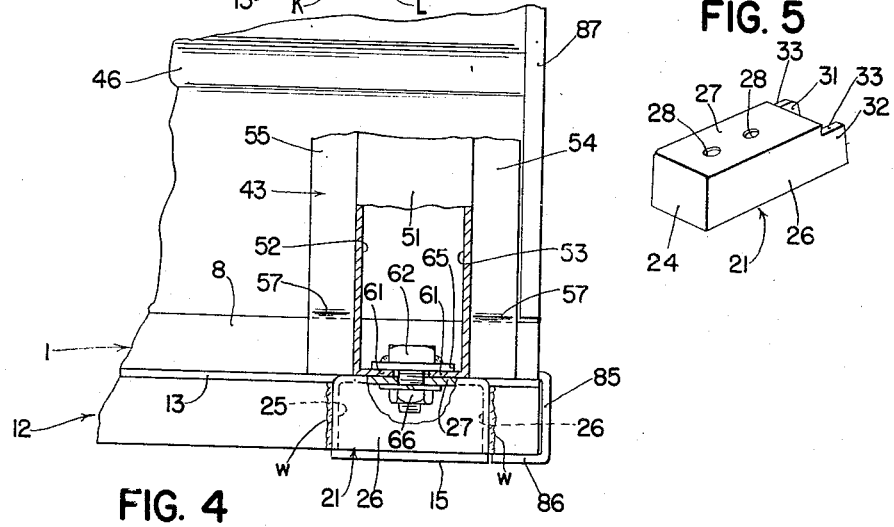
INVENTORS
CARL F. BAUER, DONALD A.
WANGELIN, CLIFFORD L. SCOTT
BY
ATTORNEYS Patented Nov. 1, 1949

2,486,381

UNITED STATES PATENT OFFICE 2,486,381

WAGON BOX

Carl F. Bauer and Donald A. Wangelin, Rock Island, and Clifford L. Scott, Moline, Ill., assignors to Deere & Company, Moline, Ill., a corporation of Illinois Application May 28, 1945, Serial No. 596,163

6 Claims. (Cl. 296—28)

The present invention relates generally to farm equipment, and more particularly to farm wagons, trailers and the like.

The object and general nature of the present invention is the provision of a new and improved sheet metal wagon box so constructed and arranged as to be strong and sturdy, yet light in weight and inexpensive to manufacture and convenient to assemble. More particularly, it is a feature of this invention to provide a metal wagon box which is grain tight and in which the bottom is suitably constructed and reenforced so as to carry heavy loads without bending or sagging. Another important feature of the present invention is the provision of new and improved side members for the wagon box and new and improved means for fastening the sides to the bottom.

These and other objects and advantages will be apparent to those skilled in the art after a consideration of the following detailed description, taken in conjunction with the accompanying drawings in which one preferred embodiment of the present invention has been shown by way of illustration.

In the drawings:

Figure 2 is an enlarged fragmentary section taken generally along the line 2—2 of Figure 1, showing the construction and reenforcing of the bottom and side connections.

Figure 3 is a fragmentary view, somewhat similar to Figure 1, showing one of the front reenforcing members.

Figure 4 is a fragmentary side view, made on a larger scale, showing the manner of securing the bottom and side reenforcements.

Figure 5 is a perspective view of one of the bottom sheet cleats.

Figure 1:
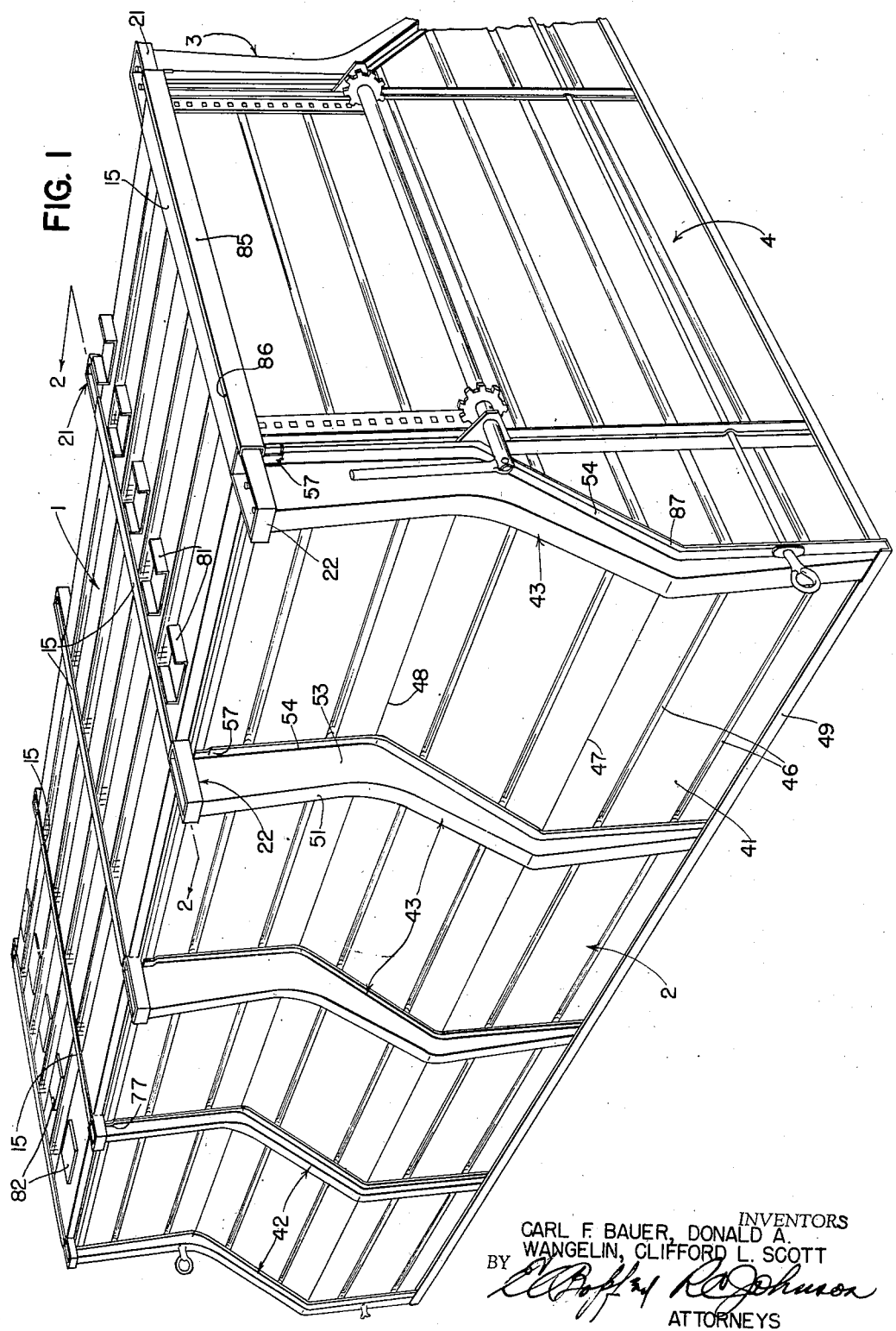
Figure 1 is a perspective view of a wagon box in which the principles of the present invention have been incorporated, the wagon box being shown in an inverted position for purposes of convenience of illustration.

Referring now more particularly to Figure 1, the wagon box in which the principles of the present invention have been incorporated comprises a bottom member 1, a pair of side members 2 and 3, a front endgate (not shown) and a rear endgate 4. The wagon box shown is provided with flaring side members 2 and 3 and is of the type generally known as a grain tank inasmuch as one of the principal uses of the wagon box of this type is to haul grain or the like. It is to be understood, however, that the present invention is not necessarily limited to a wagon box of the grain tank type.

The bottom member 1 of the grain box is of particular construction and, as will be described below in detail, is very strong and rigid so that there is no tendency for the bottom to deflect or sag over the front and rear bolsters under full loads. As best shown in Figures 1 and 2, the bottom 1 is made up of a flat bottom sheet 7 having upturned marginal edges 8 and 9 along opposite sides. Running longitudinally of the sheet 7 and the entire length thereof is a plurality of reenforcing channel members 12, each having side flanges 13 which lie against the underside of the bottom sheet 7. These flanges 13 are spot welded, or otherwise securely fixed to the bottom sheet 7. The laterally outer channel has its laterally outer flange disposed substantially flush with the adjacent upturned marginal section 8 or 9, and the channels 12 are so constructed and dimensioned that the lines of spot welds, indicated at $a$, $b$, $c$, etc., are equally spaced across the bottom member. That is, the line of welds $a$ is spaced a certain distance from the welds securing the laterally outer flange 13 of the laterally outer channel member 12 to the edge of the bottom sheet, and this distance is the same as the distance between all other lines of welds, as, for example, $a$—$b$, $b$—$c$, etc. A plurality of reenforcing straps 15 is laid across the several channels 12, each strap being spot welded at one or more points to the webs of all of the channel members which it crosses. For example, referring to Figure 3, each strap 15 may be spot welded, as at K and L, to the web portion of each associated longitudinal channel 12. As will be clear from Figure 1, in the form of wagon box illustrated there are five transverse reenforcing straps 15, three intermediate straps and front and rear end straps, each being fastened to the webs of the channels they cross, and the channels 12 are spot welded at a multiplicity of points along their flanges to the bottom sheet 7.

A pair of extensions or cleats 21 and 22 is fixed to the bottom member 1 in line with each reenforcing strap member 15. As best shown in Figure 5, each of these cleats or extensions is formed of sheet metal, somewhat in the shape of an inverted pan, having sides or margins 24, 25 and 26, and a central or web section 27 which is apertured, as at 28. The side sections 25 and 26 are extended, as at 31 and 32 (Figure 5), these extending portions being shaped to fit against the laterally outer edge or side of the laterally outer channel member 12 associated therewith, the extensions 31 and 32 being offset downwardly as at 33, corresponding to the thickness of the laterally outer flange 13. These extensions 31 and 32 of each of the cleat members 21 and 22 are welded to the laterally outer side of the associated channel member, and by virtue of the offsets 33 just mentioned, the main planar portion 27 of each cleat is disposed in the plane of all of the channel flanges 13, just underlying the plane of the main portion of the bottom sheet 7. This welding is indicated by the reference character $w$ in Figure 4. Thus, as best shown in Figure 2, each pair of cleats 21 and 22, together with the associated main portion strap 15 and the adjacent portions of the bottom sheet 7 and channels 12, form what might be considered a strong rigid truss-like section which is especially rigid against downward deflection. As mentioned above, the lateral distances between the several lines of welds $a$, $b$, $c$, etc. is constant, and this provides for uniform stressing of the various portions of the bottom member under load.

Referring again to Figure 1, each of the side members 2 and 3 comprises generally a corrugated side sheet 41 and a plurality of vertical reenforcing supporting members 42 and 43. The two forward supporting members 42 are somewhat smaller than the three rearward supporting members, due to the fact that ordinarily the front endgate is never removed and hence the forward side supports are not ordinarily called upon to support or carry as much load laterally outwardly as the rearward side supports. Each side sheet is provided with a plurality of longitudinal corrugations 46 for the purpose of strengthening and reenforcing the same, and each side sheet is bent at 47 and 48 so as to provide the necessary shape to form a flaring wagon box. The uppermost edge or margin of each side sheet 41 is provided with a flanged section 49 that is bent outwardly and then downwardly (upwardly in Figure 1), enclosing the upper ends of the side reenforcing supports 42 and 43. This construction also reenforces the upper edge of the wagon box sides.

Each of the reenforcing side supports 43 is formed generally as a channel members shaped to conform to the flaring configuration of the wagon box and materially deeper at its lower end than at its upper end. Each side support 43 includes a laterally outer web portion 51, a pair of side sections 52 and 53, and attaching flanges 54 and 55. The side flanges 54 and 55 are spot welded or otherwise secured to the side sheet 41, and the lower portions of the two side sections 52 and 53, particularly the flanges 54 and 55 thereof, are offset, as at 57, so as to accommodate the disposition of the adjacent bottom sheet margin, 8 or 9, which lies laterally outwardly of the lower edge of the bottom sheet 41, as best shown in Figure 2. The lower edge of each side section 52 and 53 of each side support 43 is provided with a laterally inwardly directed extension 61. As best shown in Figure 4, the edges of these extensions 61 do not meet but, instead, provide a space between which a pair of bolts 62 may extend.

The cleat member, 21, or 22, associated with each side support 43 is provided with two openings 28, as mentioned above, which received the two attaching bolts 62. To facilitate assembly, the two bolts 62 are extended through openings in an attaching plate 65 to which the heads of the two bolts 62 are secured, as by welding. The plate 65 is itself welded to the inwardly directed extensions 61 so that, in effect, the two bolts 62 form downwardly extending studs which serve as integral parts of the associated side support member 43. Nuts 66, with suitable lock washers or the like, if necessary, are disposed on the lower ends of the bolts or studs 62 and when tightened serve to rigidly connect the associated side support member 43 to the associated cleat, thereby firmly securing the associated side member 2 to the adjacent portion of the bottom member 1.

The front side supports 42 are substantially identical with the side supports 43 except that they are not quite so deep at their lower ends. Therefore, the associated cleat construction and the attaching bolts, while otherwise the same as described above in connection with the attaching means for the side supports, are somewhat simplified. As best shown in Figure 3, the laterally inturned edges 71 of each side support member 42 receives a plate 72 in which a single bolt 73 is disposed, being welded thereto. The plate 72 is welded to the edges 71. The cleat 74 is like the cleat shown in Figure 5 except that only one hole 75 is provided. The cleat 74 is welded to the adjacent side of the laterally outer channel member 12 in substantially the same manner as described above in connection with the cleats 21 and 22.

When attaching the side members 2 and 3 to the bottom number 1, the only connections that are required to be made are the bolts or studs 61 and 62, together with the front studs or bolts 73. As will be clear from the above description, it is a relatively simple matter to bolt the lower ends of the reenforcing side supports 42 and 43 to the associated bottom member cleats 21, 22 and 74, the marginal flanges 8 and 9 on the bottom sheet fitting snugly in the spaces provided by the offsets 57. The front side support is provided with a similar offset 77 (Figure 3). In this way, it is not necessary to bolt the flanges 8 and 9 to the lower edges of the side sheets 41, yet since the bottom member is exceptionally rigid and nonsagging, the wagon box remains grain tight at all times. As best shown in Figure 1, clips 81, preferably in the form of sections of a channel, are welded to the web portions of the longitudinal channel members 12 so as to provide means for receiving the rear bolster of the running gear on which the box is mounted, the particular form of the channel clips 81 serving to prevent longitudinal displacement of the wagon box. At the front end of the latter, wear plates 82 may be welded to the lower sides of the reenforcing bottom channels 12. The rear end of the bottom sheet 7 is extended downwardly, as at 85 (Figure 4), and then forwardly, as at 86, snugly embracing the rear ends of the bottom channels 12. This also provides a reinforced rear edge for the wagon box bottom and a smooth upper surface to receive the lower edge of the rear endgate 4. Each of the side sheets 41 is formed with a bead or flange 87 that is turned forwardly to provide a reenforcing, the forward edge of the forwardly turned bead 87 substantially contacting the rear flange 54 of the rear support member 43. The endgate 4 is of particular construction and forms the subject matter of a separate application.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A sheet metal wagon box comprising a bottom sheet having upturned marginal flanges at opposite sides, reenforcing channels extending longitudinally of and secured to the lower side of said bottom sheet, the laterally outer channel member at each side of the bottom sheet being disposed along the marginal portion of the bottom sheet at that side thereof, side sheets having their lower edges disposed against said flanges on the inside thereof, cleats fixed to the sides of the laterally outer reenforcing channel members and extending laterally outwardly beyond the upturned flanges of the bottom sheet, and means on said side sheets adapted to be connected with said cleats for fixing said side sheets to said bottom sheet with the flanges of the latter lying on the outer sides of the lower edges of said sheets.

2. A wagon box comprising a bottom member, a pair of side members, cleats extending laterally outwardly from said bottom member at opposite sides, side supports fixed, respectively, to the outer sides of said members, each side support comprising a channel member having an outer wall, side walls and laterally extended flanges at the inner portions of said side walls, each of said side supports being formed at its lower end section with generally horizontal laterally inwardly extending flanges forming extensions of the side walls of the side support, and means engaging said laterally inwardly extended flanges for securing said side supports to the associated cleats.

3. A wagon box comprising a bottom member, side members adapted to be connected to said bottom member, the latter having a plurality of generally longitudinally extending reenforcing channels having flanges and means connecting the flanges of said reenforcing channels to the bottom side of said bottom member, the laterally outer channels being connected to the bottom member closely adjacent the sides thereof, laterally outwardly projecting cleats connected to the outer sides of the outer reenforcing bottom channels, the cleats at one side of said bottom member being respectively opposite the corresponding cleats at the other side, a plurality of reenforcing strips extending transversely of said reenforcing channels and secured to the latter in such positions as to connect opposite cleats, and a plurality of reenforcing side supports fixed to said side members on the outer sides thereof and detachably connected, respectively, with said cleats.

4. In a wagon box having a bottom with an extension having a vertical opening and disposed outwardly of the bottom at one side thereof, the improvement which comprises a side support comprising a channel member having laterally inturned flanges at its lower end, a plate fixed to said flanges on the inside of said channel member at the lower end thereof, and a stud fixed to said plate and extending downwardly below the lower end of said channel member and through the opening in said extension for attachment thereto.

5. In a wagon box or the like, a bottom member comprising a bottom sheet having upturned flanges at its opposite sides, a plurality of channel members fixed to the underside of said bottom sheet to form reenforcing members therefor, one or more straps fixed to the intermediate portions of said channel members and extending transversely of said bottom sheet so as to form with said channel members a reenforcing truss-like structure, and a plurality of cleats, each including a part having downwardly extending marginal flanges on opposite sides thereof, the two opposite flanges being shaped to extend laterally inwardly and formed to fit against the laterally outermost portions of the laterally outer channel members, the latter being secured to said bottom sheet with the edge of the laterally outer flange substantially flush with the plane of the associated upturned flange on the bottom sheet, said cleats being fastened to said laterally outermost channel member substantially in transverse alignment with said straps.

6. In a wagon box or the like, a bottom member comprising a bottom sheet having upturned flanges at its opposite sides, a plurality of channel members fixed to the underside of said bottom sheet to form reenforcing members therefor, one or more straps fixed to the intermediate portions of said channel members and extending transversely of said bottom sheet so as to form with said channel members a reenforcing truss-like structure, and a plurality of cleats, each including a part having downwardly extending marginal flanges on opposite sides thereof, the two opposite flanges extending laterally inwardly relative to the bottom member and formed to fit against the laterally outermost portions of the laterally outer channel members the latter being secured to said bottom sheet with the edge of the laterally outer flange disposed adjacent the plane of the associated upturned flange on the bottom sheet, the inner portions of said cleat flanges being connected to said outermost portions of the laterally outer channel members substantially at the juncture therewith of the associated straps, said cleats being fastened to said laterally outermost channel members substantially in transverse alignment with said straps.

CARL F. BAUER.
DONALD A. WANGELIN.
CLIFFORD L. SCOTT.

REFERENCES CITED

The following references are of record in the file of this patent:

UNITED STATES PATENTS

| Number | Name | Date |
|---|---|---|
| 697,949 | Schofield | Apr. 15, 1902 |
| 1,139,456 | Ledwinka | May 11, 1915 |
| 1,207,842 | Bergren | Dec. 12, 1916 |
| 1,228,138 | Rogers | May 29, 1917 |
| 1,388,896 | Sage | Aug. 30, 1921 |
| 1,556,757 | Christianson et al. | Oct. 13, 1925 |
| 1,675,317 | Burke | July 3, 1928 |
| 2,211,618 | Gilpin | Aug. 13, 1940 |
| 2,257,365 | Barrett | Sept. 30, 1941 |
| 2,275,349 | Collender | Mar. 3, 1942 |
| 2,380,861 | Meyer et al. | July 31, 1945 |